UNITED STATES PATENT OFFICE.

JOSEF HUEBNER, OF CHICAGO, ILLINOIS.

METHOD OF MAKING SPONGE-RUBBER.

1,103,359.  Specification of Letters Patent.  Patented July 14, 1914.

No Drawing.  Application filed January 25, 1913.  Serial No. 744,171.

*To all whom it may concern:*

Be it known that I, JOSEF HUEBNER, subject of the Emperor of Germany, residing at Chicago, in the county of Cook and State of Illinois, have invented certain new and useful Improvements in Methods of Making Sponge-Rubber; and I do hereby declare the following to be a full, clear, and exact description of the invention, such as will enable others skilled in the art to which it appertains to make and use the same.

This invention has for its object to devise a novel process for producing a superior quality of so-called sponge rubber, and consists in the several steps and the mixture and treatment of ingredients hereinafter fully described and particularly claimed.

In carrying out my process, I employ ordinary rubber vulcanizing molds and the machinery ordinarily employed in the preparation of vulcanizable rubber compounds.

The particular object of my invention is to provide a sponge rubber which will be very tough and elastic and, which, furthermore, will not dry or become hard or brittle except after the lapse of many years.

A number of the ingredients which I employ are commonly used to produce sponge-rubber but the product usually produced lacks the resiliency and toughness desired where it is used as a cushion, and, furthermore this product rapidly deteriorates and becomes hard and brittle.

The essence of the invention resides in the addition to a vulcanizable rubber compound of a liquid preservative which is substantially non-drying and does not chemically affect the rubber deleteriously but maintains the same at all times moist and, by reason of its preservative qualities, greatly increases the life thereof, and in subjecting the resulting mixture within a mold during consecutive intervals of time to successively increased temperatures, whereby the volatile ingredients in the mixture will be uniformly volatilized throughout the mass before the latter is vulcanized.

Other advantages gained reside in the increased toughness and elasticity of the product whereby it will respond instantly like a spring to the release of pressure applied thereto.

The compound is preferably made and described in the following manner and when so made is, so far as my experiments have demonstrated, possessed of the most desirable qualities and advantages, but the proportions of ingredients used and the time and temperatures of vulcanization may be varied without departing from the invention. The ingredients named have been found best adapted but equivalents thereof may be substituted without departure from the invention.

In producing the said compound I employ by weight substantially the following proportions of ingredients; viz.: sixty (60) parts rubber gum, five (5) parts resin oil, ten (10) parts zinc oxid, ten (10) parts spirits of turpentine, five (5) parts flour of sulfur, ten (10) parts ammonium carbonate. In mixing these ingredients I first add to the rubber gum, which has been theretofore worked through the usual rolls to primarily produce a dough, the said resin oil and after this has been added the said gum or dough is again passed through the rolls repeatedly until the resin oil has been thoroughly distributed through the mass in a finely divided state. I then add the zinc oxid which is also similarly distributed through the mass by working the gum again through the rolls repeatedly and this operation is successively repeated after adding turpentine, flour sulfur and ammonium carbonate in the order named. The resulting compound is then placed in a mold in the usual manner and is subjected to heat by means of steam surrounding the mold in the usual manner except that primarily steam under five (5) pounds pressure is admitted to the vulcanizing drum for a period of five (5) minutes more or less and is then increased to ten (10) pounds which is maintained for ten (10) minutes more or less; the pressure being thus gradually increased preferably five (5) pounds at a time and maintained substantially the same number of minutes as the pounds pressure indicated until thirty-five (35) pounds pressure more or less has been attained in the vulcanizer; this being then continuously maintained for one (1) hour and fifty (50) minutes, but, in the event that the mass to be vulcanized is excessively large, the last-named pressure may be maintained for a proportionately longer period, and thereafter the mold is permitted to cool preferably gradually but such cooling may be accelerated without injury to the vulcanized product.

During the initial steps of heating which precede the vulcanization the volatile constituents consisting of the turpentine and ammonium carbonate are transformed into gas globules which expand and produce cells, the prolonged continuation of the heat at a point below that required for the vulcanization giving the finely divided volatile matter time to become fully expanded before the rubber compound becomes set.

At each increase of temperature the heat, being applied through the mold housing the compound or mixture, first expands the outer cells or pores and if the temperature were continuously increased up to the point of vulcanization, the outer or surface cells would be considerably larger than those in the interior of the vulcanized mass. To avoid this, I maintain the temperature applied to the mold substantially constant after each rise in temperature for a sufficient length of time to enable the increased heat to penetrate the interior of the compound, thereby causing the cells to equalize in size. By thus subjecting the mixture while within a mold to a series of temporarily maintained and successively increased temperatures (ranging from that required for vaporizing the ammonium carbonate or other vaporizable ingredients, to that required for vulcanization) and finally subjecting it for a longer time to the temperature sufficient to vulcanize the mixture, I produce a rubber sponge of substantially uniform porosity.

The resin oil is a non-hardening and non-drying substance, and, when admixed with the compound to impregnate the latter therewith, prevents such compound from becoming hard and brittle and otherwise deteriorating as is usual with compounds of this nature. The said resin oil also acts as a preservative, thereby insuring a product of permanent elasticity.

The foregoing proportions of the several ingredients may be slightly changed and varied without departing from the invention as may also the time and temperatures employed in vulcanization, that is to say, a variation from the proportions and time and temperatures given of ten (10) to fifteen (15) per-cent. would produce results very similar to those produced by using the exact proportions, temperatures and time above given. The resulting compound is particularly adapted as a filling for tires or other devices such as rubber stamps and the like, in which resiliency is required. The compound is exceedingly elastic and quick to react after compression and is, therefore, particularly adapted to all purposes where liveliness is a requisite.

I claim as my invention:

1. The process for producing sponge rubber which consists in intimately admixing with a vulcanizable rubber compound a plurality of volatile ingredients adapted to be transformed into gaseous fluids at various temperatures none greater than that required for vulcanization of said compound; placing said compound in a mold and subjecting it successively to increasing degrees of heat each adapted to transform at least one of said volatile ingredients and maintaining each succeeding degree of heat for a period requisite to penetrate the whole mass, and finally increasing said temperature to the point and for the period requisite to vulcanize said compound.

2. The process for producing sponge rubber of substantially uniform porosity and permanent elasticity which consists in mixing a vulcanizable rubber compound with a non-drying liquid adapted to preserve the compound after vulcanization thereof, and with a plurality of ingredients adapted upon heating to be vaporized at different temperatures to form cells in the compound; placing the resulting mixture in a mold and subjecting the mold for appreciable intervals of time, respectively, to a series of temporarily maintained successively higher temperatures corresponding to those required for vaporizing the said ingredients respectively; and thereafter subjecting the said mold to a temperature sufficient to vulcanize the contents thereof.

3. The hereindescribed process for producing sponge rubber which consists in admixing with rubber successively at different intervals, resin oil, zinc oxid, turpentine, flour of sulfur and ammonium carbonate in the proportions, more or less, named, and thereupon vulcanizing the mass by placing the same in a mold, placing the latter in a vulcanizer and admitting steam to the latter at intervals at successively higher temperature to gradually increase the temperature of the compound until a maximum of substantially thirty-five pounds pressure is attained and maintaining the said pressure for a period of one and five-sixths hours more or less.

In testimony whereof I have signed my name in presence of two subscribing witnesses.

JOSEF HUEBNER.

Witnesses:
M. BOYLE,
ALBERT SCHEIBLE.